United States Patent [19]
Alanärä

[11] Patent Number: 6,058,185
[45] Date of Patent: May 2, 2000

[54] PORTABLE TELEPHONES

[75] Inventor: Seppo M Alanärä, Tokyo, Japan

[73] Assignee: Nokia Mobile Phones Limited, Espoo, Finland

[21] Appl. No.: 09/037,533

[22] Filed: Mar. 10, 1998

[30] Foreign Application Priority Data

Mar. 14, 1997 [FI] Finland ................................. 971107

[51] Int. Cl.[7] .................................................. H04M 1/00

[52] U.S. Cl. ........................................ 379/446; 379/455

[58] Field of Search ................................. 379/446, 455, 379/454, 426, 449; 224/930

[56] References Cited

U.S. PATENT DOCUMENTS

| | | | |
|---|---|---|---|
| 5,138,329 | 8/1992 | Saarnimo et al. | 343/702 |
| 5,168,982 | 12/1992 | Hakanen et al. | 200/342 |
| 5,222,132 | 6/1993 | Rioux, Jr. | 379/455 |
| 5,768,371 | 6/1998 | Snyder | 379/446 |

*Primary Examiner*—Jack Chiang
*Attorney, Agent, or Firm*—Perman & Green, LLP

[57] ABSTRACT

A mobile telephone 16 has an engagement member 21 projecting from the phone housing 17 for the purpose of securing the phone 16 to a belt clip 1. The engagement member 21 is spring mounted within the housing 17 and cooperates with the belt clip 1 to take the phone 16 off-hook when an incoming call is received and the phone 16 is removed from the belt clip 1.

2 Claims, 3 Drawing Sheets

PORTABLE TELEPHONES

FIELD OF THE INVENTION

The present invention relates to portable telephones.

BACKGROUND OF THE INVENTION

Portable telephones are commonly provided with means for enabling them to be carried on a belt clip. This means may be for example a projection from the back side of the telephone which engages a slot in the belt clip, the projection having a relatively narrow neck portion and an enlarged head such that the head is held in the slot under gravity. Gravity alone may hold the telephone in place or there may additionally be a snap-fit connector or the like for added security.

When the telephone is held by the belt clip and an incoming call is received, a user has to both release the telephone from the belt clip and press an off-hook key on the telephone in order to open a traffic channel and answer the call. In some cases, all of the keys of the telephone keypad act as off-hook keys but nonetheless annoying delays arise from the need to both release the telephone from the belt clip and press an off-hook key.

It is an object of the present invention to overcome or at least mitigate this disadvantage.

This object is achieved by providing an off-hook switch which is activated by the action of removing a mobile communications device from a user wearable holder.

SUMMARY OF THE INVENTION

According to a first aspect of the present invention there is provided a mobile communications device comprising at least one off-hook switch for enabling a user to open a traffic channel, said switch comprising means for cooperating with a user wearable communications device holder so that removal of the device from the holder activates the switch to open said traffic channel.

In one embodiment of the present invention, said switch comprises a mechanical member which is movable between a first position and a second position, said switch being deactivated in said first position and being activated in said second position, wherein removal of the device from the holder causes said member to move from said first to said second position. Preferably, replacement of the device in the holder causes the member to move from the second to the first position.

In an alternative embodiment, the switch comprises a light detector which, when the device is held by the holder, is substantially shielded from ambient light by the user or his/her clothes. The switch further comprises a threshold detector coupled to the output of said detector for activating the switch when the level of detected light exceeds a predetermined threshold. Said threshold detector may be further arranged to deactivate the switch when the level of detected light falls below said threshold.

In yet another embodiment of the invention, said switch comprises at least one electrically conductive member arranged to contact a cooperating conductive member on the device holder. The switch comprises detection circuitry for detecting whether or not contact is made between said two conductive members and to deactivate said switch if contact is made and to activate said switch if contact is not made.

The mobile communications device of the present invention may be, for example, a mobile telephone or a combined mobile telephone/personal data assistant.

According to a second aspect of the present invention there is provided a mobile communications device according to the above first aspect of the present invention in combination with a user wearable communications device holder.

The holder may be a belt clip or may be, for example, a shoulder holster.

In one embodiment, the holder comprises mechanical or electrical means for cooperating with said device switch and arranged to activate the switch when the device is removed from the holder.

DETAILED DESCRIPTION

Figure 1:
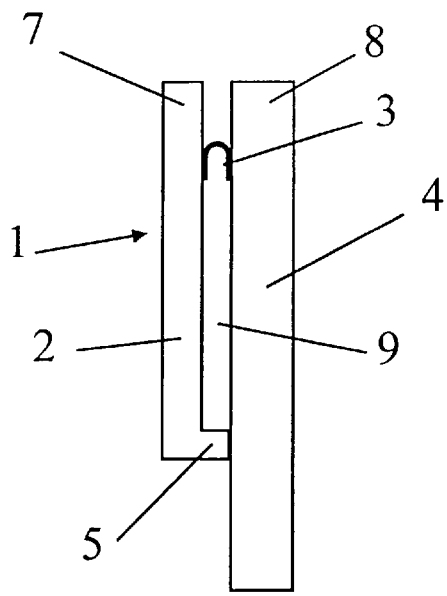
FIG. 1 shows a side view of a belt clip.
Figure 2:
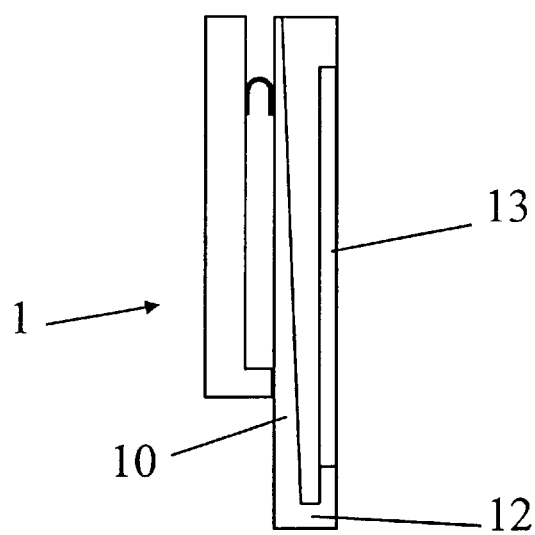
FIG. 2 shows a cross-sectional view of the belt clip of FIG. 1 taken in the plane of the paper.
Figure 3:
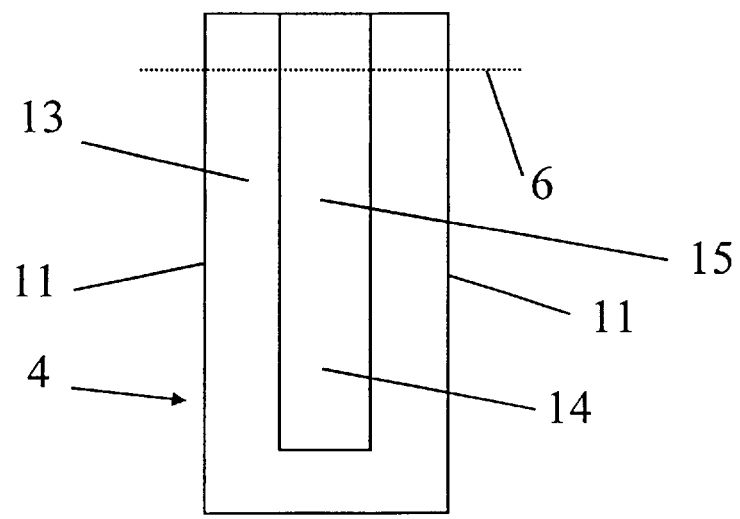
FIG. 3 shows a front view of the belt clip of FIG. 1.

With reference to FIGS. 1 to 3, a belt clip 1 is composed of three main sections. A rear section 2 is substantially rectangular in cross-section and is of a rigid plastics material. This first section is coupled by a resilient 'U' shaped hinge member 3 to a front section 4 also of rigid plastics material. A spacer 5 which projects from a lower end region of the rear section 2 is normally pressed against a rear wall of the front section 4 under the action of the hinge member 3. The front and rear sections 4,2 can be rotated relative to one another about an axis 6 by pressing their upper ends 7,8 together. When the pressure is released, the front and rear sections 4,2 snap back into parallel alignment under the action of the hinge member 3. The dimensions of the belt clip 1 are such that when the upper ends 7,8 of the front and rear sections 4,2 are pressed together, a belt (not shown in the Figures) can be passed through the enlarged lower opening formed between the two sections into the space 9 formed therebetween, and the belt clip 1 secured to the belt by releasing the applied pressure. The spacer 5 and the action of the hinge member 3 tend to retain the clip 1 in place.

The front section 4 has a rear wall 10, opposed to the rear section 2, a pair of side walls 11 which extend at right angles from the rear wall 10, a base wall 12 closing the base of the front section 4, and a front wall 13. An elongate slot 14 is provided in the front wall 13, extending from the top of the front wall 13 to a lower region thereof. The inner surface 15 of the rear wall 10 is inclined at a shallow angle relative to the rear surface of the wall and the plane of the rear section 2.

Figures 4, 5:
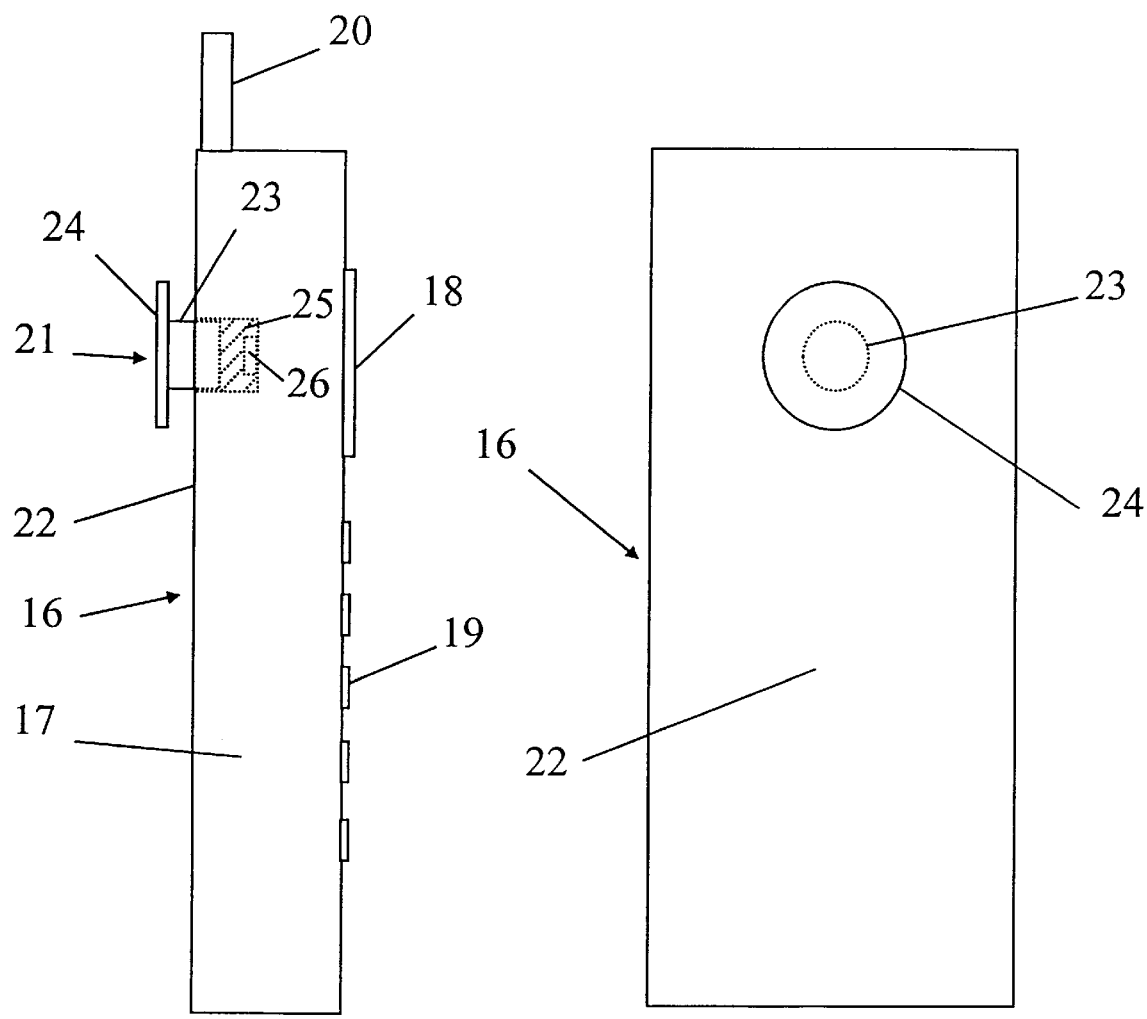
FIG. 4 shows a side view of a mobile telephone for use with the belt clip of FIG. 1.
FIG. 5 shows a rear view of the telephone of FIG. 4.

With reference to FIGS. 4 and 5, a mobile telephone 16 for use with the belt clip 1 of FIGS. 1 to 3 is of substantially conventional construction having a main housing 17 with an LCD display 18, keypad 19, and antenna 20. In a known manner, when the telephone in a 'stand-by' state and an incoming call is received, the user can take the telephone off-hook and answer the call by pressing one of the keys of the keypad 19.

A belt clip engagement member 21 projects through a rear wall 22 of the telephone housing 17 and has a relatively narrow cylindrical neck portion 23 having a diameter slightly less than the transverse width of the slot 14 provided in the front wall of the front section 4 of the belt clip 1. The engagement member 21 also has an enlarged cylindrical head portion 24 whose diameter is greater than the width of the slot 14 but less than the spacing between the two side walls 11 of the front section 4 of the belt clip 1. The telephone 16 is mounted in the belt clip by sliding the head portion 24 inside the slot 14 where the telephone 16 is held under gravity.

Within the telephone housing 17, the inner end of the neck portion 23 of the engagement member 21 engages a spring coupling 25 which separates the neck portion 23 from a contact switch 26 when the spring coupling 25 is not compressed, i.e. when no inwardly directed force is applied to the engagement member 21. The contact switch 26 acts as an additional on-hook/off-hook switch. More particularly, when the engagement member 21 is in contact with the contact switch 26, and is subsequently released upon receipt of an incoming call, the contact switch 26 takes the telephone 16 off-hook, i.e. opens a two-way traffic channel. Similarly, during a call, when the engagement member 21 is brought into contact with the contact switch 26, the switch 26 puts the telephone 16 on-hook, ending the call.

As described above, the inner surface 15 of the rear wall 9 of the belt clip front section 4 is inclined. Thus, when the engagement member 21 is inserted into the belt clip slot 14, gravity and the resulting reaction force caused by the inner inclined surface, forces the engagement member 21 inward, compressing the spring coupling 25 and bringing the engagement member 21 into contact with the contact switch 26. It will be understood that when the telephone is removed from the belt clip 1, this contact is broken, and removal takes the telephone 16 off-hook. Similarly, inserting the telephone 16 into the belt clip 1 during a call, puts the telephone 16 on-hook.

Figures 6, 7:
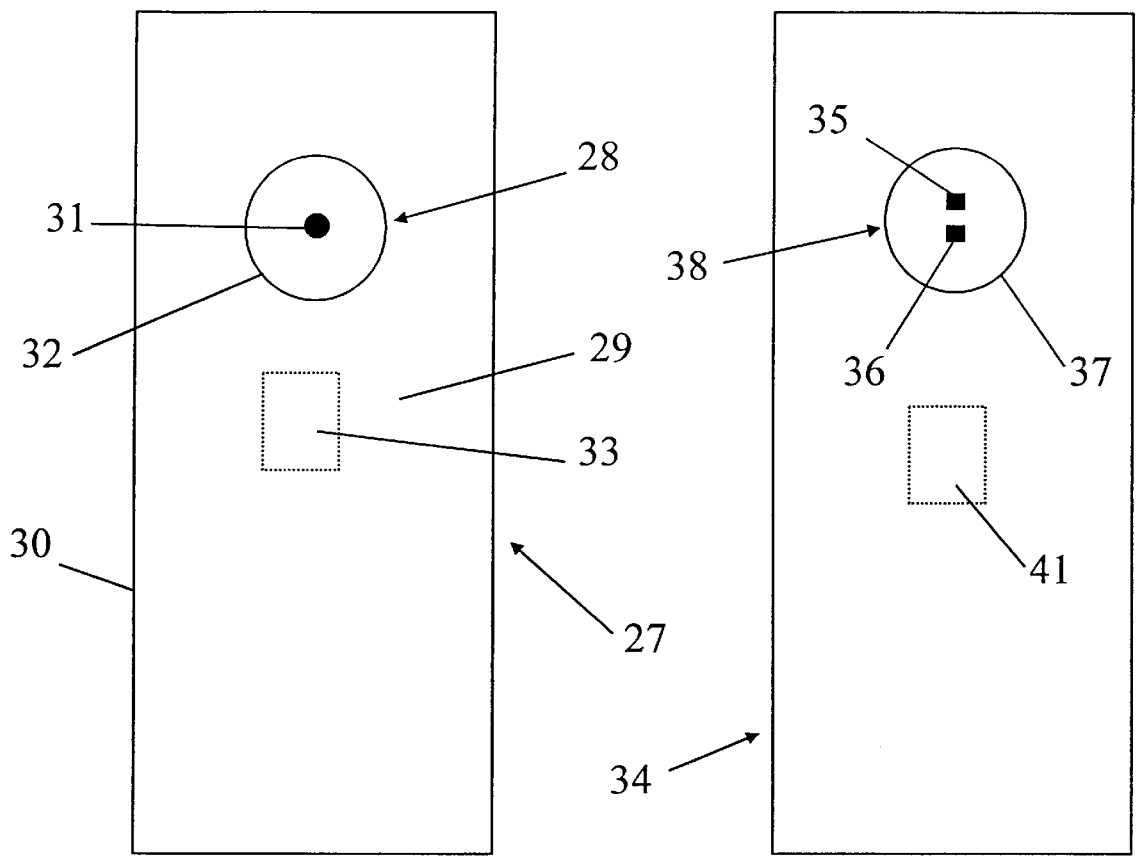
FIG. 6 shows a rear view of a mobile telephone according to a second embodiment of the invention.
FIG. 7 shows a rear view of a mobile telephone according to a third embodiment of the invention.

FIG. 6 shows a mobile telephone 27 according to a second embodiment of the present invention. The telephone has a similar construction to that of FIGS. 4 and 5 except that an engagement member 28 is rigidly secured to the rear wall 29 of the telephone housing 30 and no contact switch is provided. Instead, a light detector 31 such as a photodiode is provided in a recess of the engagement member head portion 32. The light detector 31 is coupled to a light threshold detector 33 which generates a switching signal when the level of detected light rises above some predefined threshold level. When an incoming call is received, the control circuitry of the telephone (not shown) responds to a switching signal by taking the telephone 27 off-hook. It will be appreciated that when the telephone 27 is mounted in a belt clip, the light detector 31 is substantially shaded from ambient light whilst when it is removed it is generally exposed to this light. The predefined threshold level is set accordingly. In a similar manner, a second on-hook switching signal may be generated when the level of detected light falls below the threshold level during a call, i.e. when the telephone is replaced into the belt clip.

Figure 8:
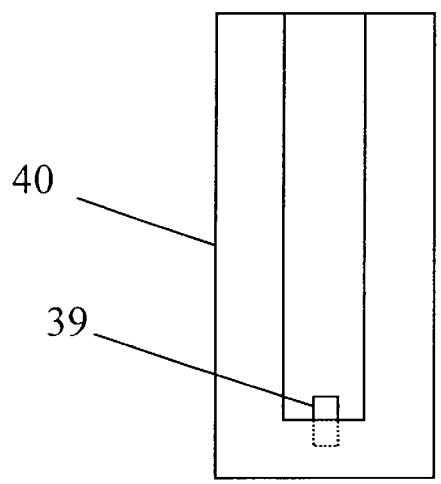
FIG. 8 shows a belt clip for use with the mobile telephone of FIG. 7.

FIG. 7 shows a mobile telephone 34 according to a third embodiment of the present invention and in which a pair of electrical contacts 35,36 are provided on the rear of the head portion 37 of the engagement member 38. A continuous metal contact 39 is provided on the inner surface of the rear wall of the belt clip front section 40, as shown in FIG. 8, such that when the engagement member 38 is fully inserted into the belt clip, the metal contact 39 short-circuits the two contacts 35,36 together. Detection circuitry 41 inside the telephone 34 detects changes from short to open circuit and generates on and off-hook signals accordingly.

It will be appreciated by the skilled person that modifications may be made to the above described embodiments without departing from the scope of the present invention. For example, a pair of capacitively coupled plates may be provided at the rear surface of the phone, coupled to a capacitance detector which provides the on-hook and off-hook signals. A third metal plate is provided on the belt clip such that the third plate is inserted between the two plates of the phone when the phone is fully inserted into the belt clip. Resulting changes in capacitance are detected by the capacitance detector and an on-hook or off-hook signal generated in response. Alternatively, a magnetic member may be incorporated into the belt clip and which is arranged to actuate a reed switch of the phone to cause an on-hook or off-hook signal to be generated. In a further modification, the phone may be provided with an over-ride mechanism which deactivates the belt-clip on-hook/off-hook action. This may be necessary, for example, where the phone is used with a 'hands-free' headset and where a user may want to remove the phone from the belt clip in the middle of a telephone conversation.

It will be appreciated that various modifications may be made to the above described embodiments without departing from the scope of the present invention. For example, the mobile phone may be composed of a number of separate housings with a first housing containing RF components and a second housing containing user interface components. In this embodiment, the off-hook/on-hook switch means are associated with the second housing as this will be the part which is removed from the belt-clip (or other holder) when a call is received.

What is claimed is:

1. A mobile communications device adapted for being releasably supported by a user wearable holder comprising:

a controller for operating the communications device;

a user interface having a first switch for actuating the controller to answer a call;

a support interface constructed on said mobile communications device having a second switch for actuating the controller to answer a call, said support interface engaging said holder; and a holder interface mounted on the holder for engagement with said support interface of said mobile communications device, said holder interface having means to deactivate said second switch when said device is supported in said holder and to activate said second switch when said device is removed from said holder.

2. A mobile communications device adapted for being releasably supported by a user wearable holder as described in claim 1 wherein the second switch is a light actuated switch and said holder interface is adapted to shield the light actuated switch such that the second switch is activated when said device is removed from said holder.

* * * * *